(12) United States Patent
Delorme et al.

(10) Patent No.: US 8,923,311 B2
(45) Date of Patent: Dec. 30, 2014

(54) COMMUNICATION SYSTEM AND METHOD

(75) Inventors: Flavien Delorme, Vence (FR); Bruno De Smet, Valbonne (FR)

(73) Assignee: Nvidia Corporation, Santa Clara, CA (US)

( * ) Notice: Subject to any disclaimer, the term of this patent is extended or adjusted under 35 U.S.C. 154(b) by 641 days.

(21) Appl. No.: 13/291,858

(22) Filed: Nov. 8, 2011

(65) Prior Publication Data

US 2013/0116008 A1    May 9, 2013

(51) Int. Cl.
*H04L 12/28* (2006.01)
*H04W 76/02* (2009.01)
*H04W 88/16* (2009.01)
*H04W 8/26* (2009.01)

(52) U.S. Cl.
CPC .............. *H04W 76/02* (2013.01); *H04W 88/16* (2013.01); *H04W 8/26* (2013.01)
USPC ........................................ 370/401; 370/310.2

(58) Field of Classification Search
CPC ................ H04L 12/66; H04L 2012/46; H04L 2012/5618; H04L 12/46; H04L 12/4637; H04L 2012/421; H04L 12/56; H04L 2012/56
USPC .............. 370/349, 310.2, 328, 338, 401, 402, 370/389
See application file for complete search history.

(56) References Cited

U.S. PATENT DOCUMENTS

2006/0140150 A1* 6/2006 Olvera-Hernandez et al. ............................. 370/331
2006/0146803 A1* 7/2006 Bae et al. ...................... 370/352

OTHER PUBLICATIONS

Summary of a Purpoted Discussion Heard at a 3GPP SA WG2 Meeting #86, Jul. 11-15, 2011, Naantali, Finland, 1 page.

* cited by examiner

*Primary Examiner* — Brenda H Pham

(57) ABSTRACT

A unit for use at a terminal as an external wireless modem. In one embodiment, the unit includes: a wireless transceiver for connecting to a gateway between the wireless cellular network and a further, packet-based network; second interface apparatus for connecting to the terminal. The unit further includes processing apparatus arranged to receive a first link layer identifier from the wireless cellular network, gateway or further network, intended for use by the terminal as a source identifier when accessing the further network via the wireless cellular network and gateway. The processing apparatus is configured to intercept at least one message being conveyed from the terminal to the gateway comprising a second link layer identifier generated by the terminal as a source identifier, translate the second identifier into the first link layer identifier and retransmit the message to the gateway with the first link layer identifier as the source identifier.

28 Claims, 5 Drawing Sheets

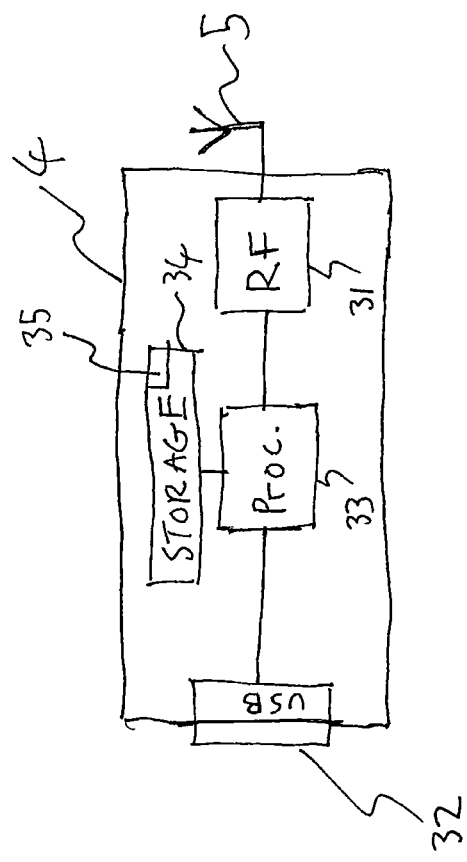

COMMUNICATION SYSTEM AND METHOD

TECHNICAL FIELD

This application relates to link protocols.

BACKGROUND

FIG. 1 is a schematic block diagram of a communication system comprising a host terminal 2 and an external wireless cellular modem 4, the modem 4 comprising an antenna 5. The host terminal 2 may be a user terminal, and may for example take the form of a desktop computer, laptop computer, tablet style computer, or mobile phone (which may be referred to as a "smart phone"). The modem 4 may, for example, take the form of a dongle for plugging into the host terminal 2. Alternatively the modem 4 may take the form of a mobile phone handset which, as well as being a conventional mobile telephone, can be connected to the host terminal 2 so as to act as an external cellular modem for the host terminal 2. The modem 4 is external to the host terminal 2 in that it is a separate unit housed in a separate casing, but which is connected or connectable to the host terminal 2 by means of a wired or wireless connection.

The system also comprises a mobile cellular network 6 such as a 3GPP network. The mobile network 6 comprises one or more access points 12 operatively coupled to a plurality of antennas 10 and GGSN (Gateway GPRS Support Node) 7. For example the one or more access points 12 may take the form of one or more instances of a suitable access point protocol such as one or more APNs (access point names), which may be implemented on one or more physical nodes of the mobile network 6. The system further comprises another, packet-based network 8, such as a wide area internetwork such as the Internet, comprising a plurality of network areas 14 and routers or gateways 16.

For connecting to the 3GPP network 6 or other such cellular network, the modem 4 comprises first physical interface apparatus comprising a wireless transceiver, typically in the form of a radio frequency (RF) transceiver and an antenna 5. This interface apparatus of the modem 4 connects via an antenna 10 of the cellular network 6 to an access point (e.g. APN) 12 of the cellular network 6, which is operatively coupled to the GGSN 7 of the mobile cellular network 6. For example, if the mobile cellular network 6 is a 3GPP network, then the connection between the modem 4 and a 3GPP network may be called a PDP (Packet Data Protocol) context in 2G or 3G terminology, and an EPS (Evolved Packet System) bearer context in LTE (Long Term Evolution standards). The physical medium of the connection is typically a radio channel such as a 2G, 3G or LTE radio channel and the protocol that drives it may comprise a set of protocol layers as defined for example by 3GPP. Each of the one or more access points 12 (e.g. APNs) connects on to a respective router 16 of the Internet 8. The first router 16 encountered on the route onwards from the mobile cellular network 6, i.e. the router immediately connecting to the APN 12, is the gateway between the cellular network 6 and the Internet 8.

For connecting to the host terminal 2, the modem 4 comprises second physical interface apparatus. The second interface, between the host 2 and modem 4, could for example comprise a wired connection such as USB, or a short-range wireless transceiver such as an infrared connection or a radio frequency connection (e.g. Bluetooth).

The host terminal 2 is installed with one or more applications 18 which when executed on the host terminal 2 send and/or receive communications over the Internet 8 via the first and second interface apparatuses, wireless cellular network 6 and the relevant gateway 16, supported by the GGSN 7. The system allows the host terminal to access the Internet 8, e.g. using Internet Protocol version 6 (IPv6) and/or Internet Protocol version 4 (IPv4). The host terminal 2 may be installed with and run one or more applications 18*i* configured to make use of a combination of IPv4 and IPv6 features or that can operate in modes based on either IPv4 or IPv6, and/or one or more applications 18*ii* that operate exclusively based on use of IPv6. To this end, the modem 4 may be operable to establish a context 20*i* with an APN 12*i* which together can support either IPv4 or IPv6, and/or to establish a context 20*ii* with an APN 12*ii* which together operate exclusively based on IPv6.

The protocol stack which drives the physical connection between the host terminal 2 (via the modem 4) and the access point 12 (e.g. APN) will include a link layer protocol. Examples of link layer protocols include Ethernet and PPP (Point-to-Point Protocol). The link layer protocol is the protocol that operates at the link layer, i.e. which handles the transfer of data at a level between only adjacent nodes of a wide area network or within a local area network segment, i.e. between only terminals, routers or local network segments that are adjacent to one another (as opposed for example to Internet layer protocol which routes over multiple routing hops across multiple nodes, or transport layer protocol which is concerned with end-to-end communication issues). That is to say, the link layer protocol handles transmission at a level having visibility of only a single link or only a single hop, not multiple links or multiple hops (a link may comprise a local switch or bridge but may not extend beyond the next router, i.e. may not include more than one routing hop). A link layer protocol of interest is the protocol concerned with conveying data between a terminal such as host terminal 2 and an access point 12 of a mobile cellular network such as 3GPP network 6 (via modem 4), but not at a higher level concerned with finding a route over multiple hops between more than two of the nodes 2, 16.

For the purpose of link layer transmission, nodes such as routers and gateways 16 and terminals 2 may be allocated a link-layer identifier which may be referred to as a Link Local Identifier (or equivalently for the purpose of this application, an interface identifier, or lid). The link layer identifier may be or form a part of a link layer address, which may be referred to as link local address (LLA). For example in 3GPP and IETF standards, the source LLA identifying a terminal such as the host terminal 2 as the source of a particular communication may be built from the Link Local Identifier for the terminal 2 concatenated with a global prefix for the gateway 16 to which it is connecting or connected. The LLA or other such link-layer address provides a unique link address for a device connected to a packet-based network 8 such as an IPv6 network.

In 3GPP and IETF standards, it is specified that the IPv6 Dynamic Address Allocation shall be performed using a Link Local Identifier provided by the GGSN (Gateway GPRS Support Node). For example, 3GPP TS 24.008 par.6.1.2A.2 states that if a terminal requests allocation of an IPv6 address, the network constructs it of two parts: a "/64 IPv6 prefix" and an interface identifier [Link Local Identifier] of 64 bits in length; and that the interface identifier is only used for building a unique link local IPv6 address. 3GPP TS 23.60 par.9.2.1.1 states that to ensure the link-local address generated by the terminal does not collide with the link-local address of the GGSN, the GGSN shall provide an interface identifier [Link Local Identifier] to the terminal and the terminal shall use this interface identifier to configure its link local address (see also RFC 4862 [99]).

Generally speaking, in any arrangement where a terminal wishes to access the internet or other such packet-based network via a mobile cellular network, then an element of one of the networks may wish to allocate a link-layer identifier to the host terminal for use in setting up the access. For example, this could be so that the link-layer identifier does not coincide with that of another terminal connected or attempting to connect to the same gateway.

SUMMARY

According to one aspect of the disclosure, there is provided a unit for use at a terminal as an external wireless modem. In one embodiment, the unit includes: (1) first interface apparatus comprising a first wireless transceiver for connecting via a wireless cellular network to a gateway between the wireless cellular network and a further, packet-based network, (2) second interface apparatus for connecting to the terminal and (3) processing apparatus configured to perform operations of a wireless cellular modem so as to enable the terminal to access the further network via the wireless cellular network and gateway, wherein the processing apparatus is arranged to receive a first link layer identifier from one of the wireless cellular network, the gateway and the further network, intended for use by the terminal as a source identifier when accessing the further network via the wireless cellular network and gateway, and wherein the processing apparatus is configured to intercept at least one message being conveyed from the terminal to the gateway comprising a second link layer identifier generated by the terminal as a source identifier, to translate the second identifier into the first link layer identifier, and to retransmit the message to the gateway with the first link layer identifier as the source identifier.

According to another aspect, there is provided a computer program product for operating a unit, for use at a terminal as an external wireless modem, the unit having a processing apparatus, a first interface apparatus comprising a first wireless transceiver for connecting via a wireless cellular network to a gateway between the wireless cellular network and a further, packet-based network, and a second interface apparatus for connecting to the terminal. The computer program product includes code embodied on a non-transitory computer-readable medium and configured, when executed on the processing apparatus of the unit, to perform operations of a wireless cellular modem so as to enable the terminal to access the further network via the first interface apparatus, the second interface apparatus, the wireless cellular network and the gateway, including to perform operations of: (1) receiving a first link layer identifier from the gateway via the first interface apparatus, the first link layer identifier being intended for use by the terminal as a source identifier when accessing the further network via the wireless cellular network and gateway, (2) intercepting at least one message being conveyed from the terminal to the gateway via the second interface apparatus, the at least one message comprising a second link layer identifier generated by the terminal as a source identifier, (3) translating the second link layer identifier into the first link layer identifier and (4) retransmitting the message to the gateway via the first interface apparatus and wireless cellular network, the message being retransmitted with the first identifier as the source identifier.

According to another aspect, there is provided a method of operating a unit connected to a terminal as an external wireless modem for the terminal, the unit having a first interface apparatus comprising a first wireless transceiver for connecting via a wireless cellular network to a gateway between the wireless cellular network and a further, packet-based network; a second interface apparatus for connecting to the terminal; and a processing apparatus for perform operations of a wireless cellular modem so as to enable the terminal to access the further network via the first interface apparatus, second interface apparatus, wireless cellular network and gateway. In one embodiment, the method includes: (1) at the processing apparatus of said unit, receiving a first link layer identifier via the first interface apparatus from one of the wireless cellular network, the gateway and the further network, the first link layer identifier being intended for use by the terminal as a source identifier when accessing the further network via the wireless cellular network and gateway, (2) at the processing apparatus of said unit, intercepting at least one message being conveyed from the terminal to the gateway via the second interface apparatus, the at least one message comprising a second link layer identifier generated by the terminal as a source identifier, (3) at the processing apparatus of said unit, translating the second link layer identifier into the first link layer identifier and (4) from the processing apparatus of said unit, retransmitting the message to the gateway via the first interface apparatus and wireless cellular network, the message being retransmitted with the first identifier as the source identifier.

According to another aspect, there is provided a system. In one embodiment, the system includes: (1) a terminal, (2) a wireless cellular network, (3) a gateway between the wireless cellular network and a further, packet-based network, and (4) a unit for use at the terminal as an external wireless modem. The unit having: (4A) a first interface apparatus comprising a first wireless transceiver for connecting via a wireless cellular network to said gateway, (4B) a second interface apparatus for connecting to the terminal and (4C) processing apparatus configured to perform operations of a wireless cellular modem so as to enable the terminal to access the further network via the wireless cellular network and gateway. The processing apparatus is arranged to receive a first link layer identifier from one of the wireless cellular network, the gateway and the further network, intended for use by the terminal as a source identifier when accessing the further network via the wireless cellular network and gateway, wherein the message processing apparatus is configured to intercept at least one message being conveyed from the terminal to the gateway comprising a second link layer identifier generated by the terminal as a source identifier, to translate the second identifier into the first link layer identifier, and to retransmit the message to the gateway with the first link layer identifier as the source identifier.

BRIEF DESCRIPTION OF THE DRAWINGS

For a better understanding of the disclosure and to show how it may be put into effect, reference by way of example is made to the accompanying drawings in which:

FIG. 5 is a schematic block diagram of an embodiment of an external modem unit for use at a host terminal.

DETAILED DESCRIPTION

In some circumstances, the host terminal may not accept or use the link layer identifier which the network attempts to allocate, and may instead use its own identifier. For instance, in the configuration of host equipment using an external 3GPP modem or a 3GPP handset acting as an external modem, it may not be possible for the modem to provide the Link Local Identifier to the host. In this case the host will use an auto-configuration address. For example, problems may occur when a particular operating system does not offer the possibility to force a particular Link Local Identifier and uses an auto-generated identifier instead. This may occur on network adaptors managed by Windows XP, Windows Vista, Linux and Mac operating systems. In such cases, the 3GPP network will receive packets from an unknown Link Local Address. The 3GPP network could potentially update its routing table with the received address, but some operators will not do this as it violates 3GPP recommendations.

The disclosure provides a way to avoid such issues, which may be applicable, for example, to use in relation to any operating system. Generally speaking, a problem can occur in any situation where a network element generates a link layer identifier intended for a host terminal as a source identifier, but where the host does not use the link layer identifier as the intended source identifier. Instead, the host terminal generates its own identifier for that purpose. The disclosed embodiments can be applied in such circumstances.

Figure 1:
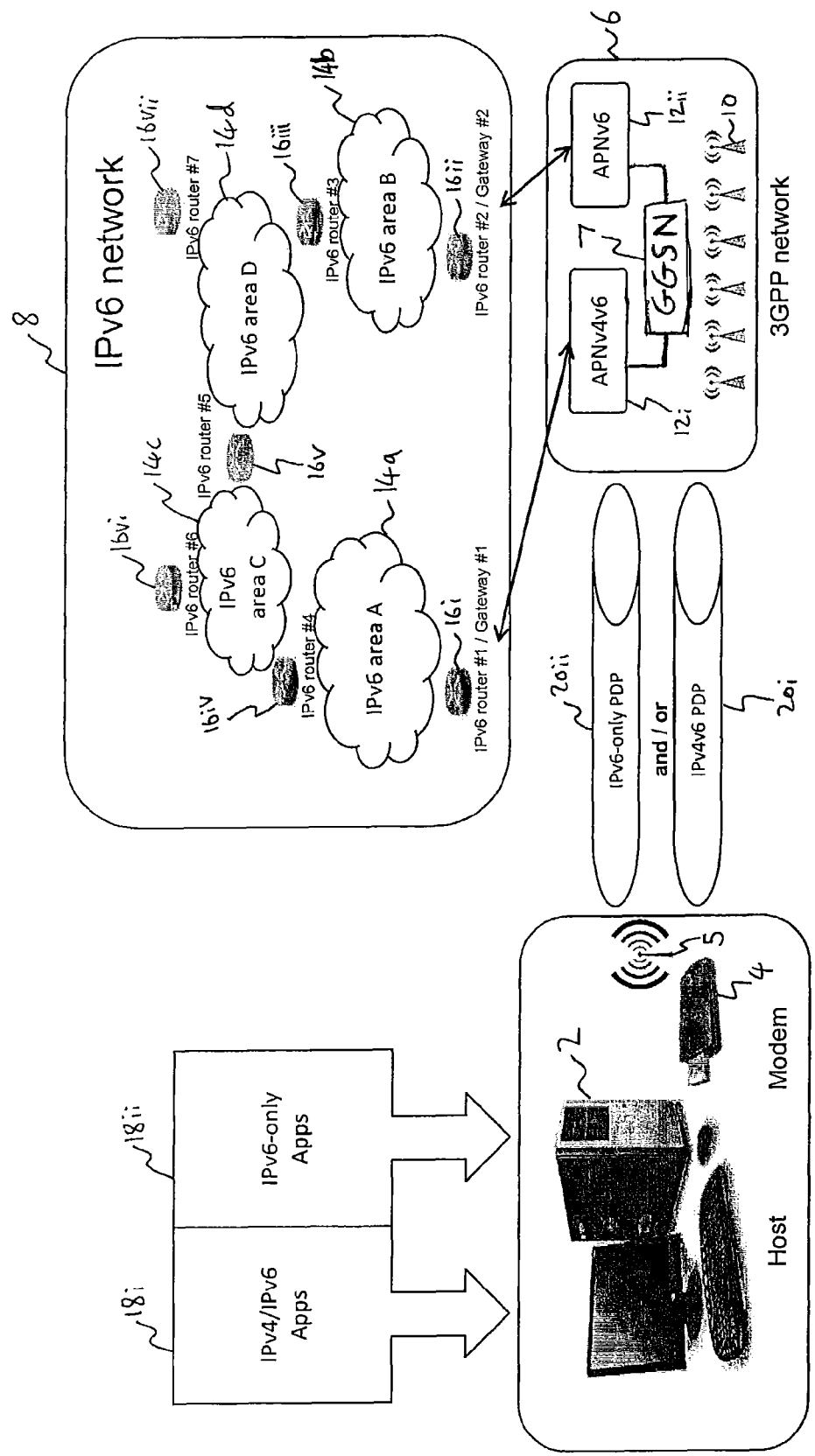
FIG. 1 is a schematic illustration of IPv6 connectivity over 3GPP network.

For example, in a 3GPP scenario, a Link Local Address translation feature may be provided in the modem unit 4 of FIG. 1 so as to intercept any outgoing packet using a link local source address and may replace that address with a link local address having a Link Local Identifier provided by the GGSN, if it is different to that generated by the host terminal 2. The same way, incoming packets sent to a Link Local Address may be intercepted and updated with the Link Local Address expected by the host terminal 2. In embodiments, the address translation feature will take any appropriate related actions such as recalculating a checksum when necessary. This way an autoconfiguration process may be made transparent to the host terminal 2 and the network 6.

In some embodiments, a processing apparatus of a unit for use at a terminal as an external wireless modem is configured to intercept at least one message being conveyed from the terminal to the gateway comprising a second link layer identifier generated by the terminal as a source identifier. The processing apparatus may be arranged to send a request to a gateway, and to receive back a response comprising a first link layer identifier from the gateway. In addition to the processing apparatus, in one embodiment the unit includes a first interface apparatus and a second interface apparatus. The second interface apparatus may comprise a wired connector.

The request may comprise a request to establish a context between the unit and the gateway via the wireless cellular network. The at least one message may comprise a solicitation message soliciting a link layer address portion from the gateway.

The processing apparatus may be arranged to receive back an advertisement message comprising the link layer address portion returned from the gateway in response to the solicitation message.

The advertisement message may comprise the first link layer identifier as a destination identifier; and the processing apparatus may be configured to intercept the advertisement message being conveyed from the gateway to the terminal, to translate the first link layer identifier into the second link layer identifier, and to retransmit the advertisement message to the gateway with the second link layer identifier as the destination identifier.

The terminal may thus be enabled to build a composite source link layer address for use in accessing a further network via the cellular network, by combining the link layer address portion with the second link layer identifier; and the processing apparatus may allow the terminal to access the further network via the wireless cellular network and gateway based on communications received from the terminal comprising the composite source link layer address. The further network may be the Internet and the cellular network may be a 3GPP network.

In some embodiments, the processing apparatus may be unable to cause the terminal to accept the first link layer identifier for use as the source identifier. Additionally, the processing apparatus may be unable to cause the terminal to accept the first link layer identifier for use as the source identifier due to an operating system used on the terminal.

The unit may comprise a dongle housing the processing apparatus and for plugging into the terminal via the second interface apparatus. The second interface apparatus may comprise a second wireless transceiver for connecting to the terminal via a local wireless connection.

In one embodiment, the unit includes a mobile phone housing the processing apparatus and for connecting to the terminal via the second interface apparatus. The mobile phone, therefore, may be operable as a telephone and as an external wireless cellular modem for the terminal.

The disclosure provides a computer program product including code embodied on a non-transitory computer-readable medium wherein the code may be configured so as when executed to perform operations in accordance with the operation of any of the possible features of the unit set out above. Additionally, the disclosure provides a method that includes operations and a system that is configured in accordance with the operation of any of the possible features of the unit set out above.

Reference is made again to FIG. 1, which shows a communication system in which disclosed embodiments may be applied. The host 2 may be any device such as a PC, laptop, or application processor connected to the modem 4 in order to obtain access to the packet-based network 8 via the modem 4 and cellular network 6, e.g. to get IPv6 connectivity and send and/or receive IPv6 traffic. The modem 4 is the device that provides a way to send and receive packets between the host 2 and cellular network 6, e.g. to send and receive IPv6 packets between the host and the 3GPP network. Referring to FIG. 5, the modem 4 may comprise a processor 33 and, operatively coupled to the processor 33, a non-transitory computer-readable storage medium 34 such as a magnetic or electronic memory storing soft-modem code. The code on the storage medium 34 is arranged to be executed on the processor 33, so as when executed to send and receive packets between the host 2 and Internet 8 or other such packet-based network via the cellular network 6, and to perform the additional operations of the modem 4 as discussed below. However, the possibility of some or all of the modem functionality being implemented in dedicated hardware is not excluded.

As mentioned, the modem 4 may for example take the form of a dongle for plugging into the host terminal 2; or may take the form of a mobile phone handset which, as well as being a conventional mobile telephone, can be connected to the host terminal 2 so as to act as an external cellular modem for the host terminal 2. The modem 4 is external to the host terminal 2 in that it is a separate unit housed in a separate casing, but which is connected or connectable to the host terminal 2 by means of a wired or wireless connection. The modem may be configured in a similar manner to that discussed in relation to FIG. 1 above, but with additional functionality added in accordance with the disclosure, an example of which will be discussed in more detail below in relation to FIG. 4.

In one embodiment, the cellular network 6 is a 3GPP network, which connects the modem 4 to the IPv6 network. For connecting to the 3GPP network 6 or other such cellular network, the modem 4 comprises first physical interface apparatus comprising a wireless transceiver 31, typically in the form of a radio frequency (RF) transceiver, and an antenna 5. The transceiver 31 is operatively coupled to the processing apparatus 33. A connection could be made of one or several bearer(s) called PDP context(s). As mentioned, for the purpose of link layer transmission, devices such as routers and gateways 16 and terminals 2 may be allocated a link layer identifier. In an IPv6 scenario, a Link Local Identifier is generated by the host IPv6 stack. Generally the Link Local Identifier can either be random, or derived from the host's Mac address when available, or assigned by the GGSN 7 as recommended by the 3GPP standard. The disclosure finds one application in the situation where the operating system on the host terminal 2 does not allow the Link Local Identifier to be allocated by the GGSN 7. The term Interface Identifier (IId) may be considered equivalent to a Link Local Identifier within the scope of the disclosure. The Link Local Address (LLA) is an address with a fixed prefix (0xFE80:0:0:0 in current standards) and a Link Local Identifier as a suffix. It is used to automatically assign an IP address to a device before performing stateless auto address configuration (SLACC). Router Advertisement and Router Solicitation messages are provided for example in the protocol ICMPv6, and defined for example in RFC4861. A Router Advertisement message is sent by a router and may contain a global prefix. These concepts are discussed in more detail below in relation to FIGS. 2 to 4. Other standards may also have their own versions of solicitation and advertisement messages.

The connection between the modem 4 and the APN 12 of the cellular 3GPP network, and therefore between the modem 4 and gateway 16 to the IPv6 network 8, includes one or more contexts 20 in the form of one or more PDP contexts or one or more EPS bearer contexts. In some embodiments, each context may provide a point-to-point connection between the modem 4 and the relevant gateway 16.

For connecting to the external modem 4 to its host terminal 2, the modem 4 comprises second physical interface apparatus 32 operatively coupled to the processing apparatus 33. This second interface 32, between the host 2 and modem 4, could for example comprise a wired connection such as USB, or a short-range wireless transceiver such as an infrared connection or a radio frequency connection (e.g. Bluetooth).

Figure 2:
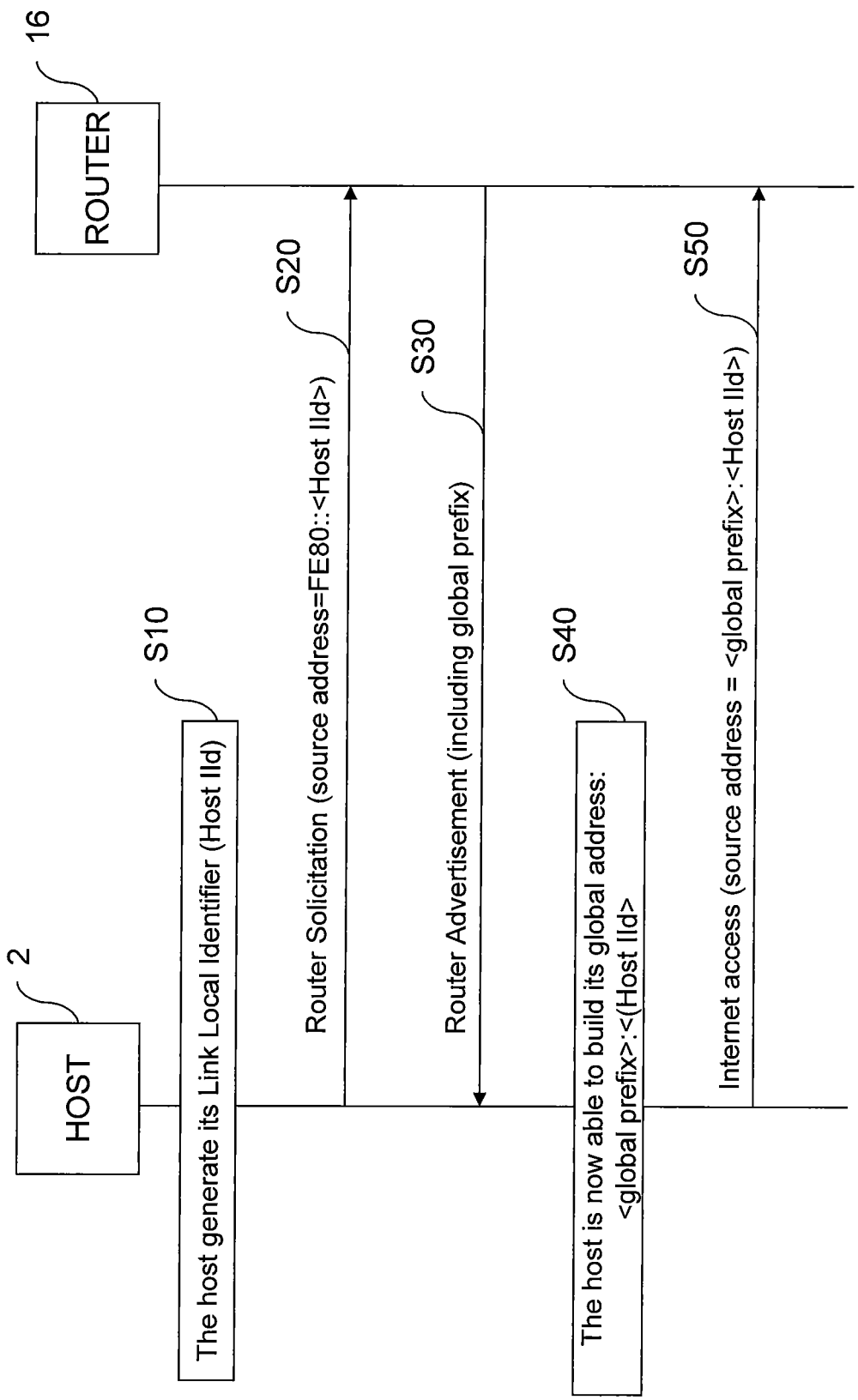
FIG. 2 is a signalling chart of an embodiment of a stateless auto address configuration method.

FIG. 2 is a signalling chart illustrating a basic situation that could be implemented for example under the 3GPP and IETF standards, in which for the sake of comparison with disclosed embodiments the host terminal 2 connects directly to the internet 8 by means of a router 16 such as one of 16iii to 16vii (instead of via an external modem 4, mobile cellular network 6 and gateway 16i or 16ii). For example this may describe a stateless auto address configuration (SLACC) process.

At step S10 of FIG. 2, the host terminal 2 generates its own Link Local Identifier (Host IId). As mentioned, this could be random or derived from the host's Mac address when available. At step S20, as a part of a router discovery procedure, the host terminal 2 sends a router solicitation message to the router 16. The router solicitation message comprises as an initial or provisional source address a fixed, default prefix (in this case FE80) combined with the host's Link Local Identifier (Host IId) as a suffix. The host's Link Local Identifier in the initial source address acts as a source identifier to initially identify the host terminal 2 to the router 16 within the discovery procedure. The router discovery procedure continues at step S30 with the return of a router advertisement message from the router 16 to the host terminal 2. The returned router advertisement message comprises a global prefix for use by the host terminal 2 in building a Local Link Address. This address prefix is global in the sense that the gateway will be known on the whole internet network as accessible via this address (not just a link local address restricted to a local network). The router discovery procedure using these messages allows the host to find a local router and learn important information about the router and the network such as IPv6 prefix and MTU (maximum transmission unit). Other standards may also have variants of the solicitation and advertisement messages.

At step S40, the host terminal builds its global LLA address by concatenating or otherwise combining the global prefix provided by the router 16 with the hosts Link Local Identifier (Host IId) generated by the host 2 as a suffix. The result is a composite address in the form of a Local Link Address which the host terminal 2 can use as a source address to identify itself to the router 16 within the link layer protocol for subsequent communications sent from the host terminal 2 to the router 12. See step S50.

Figure 3:
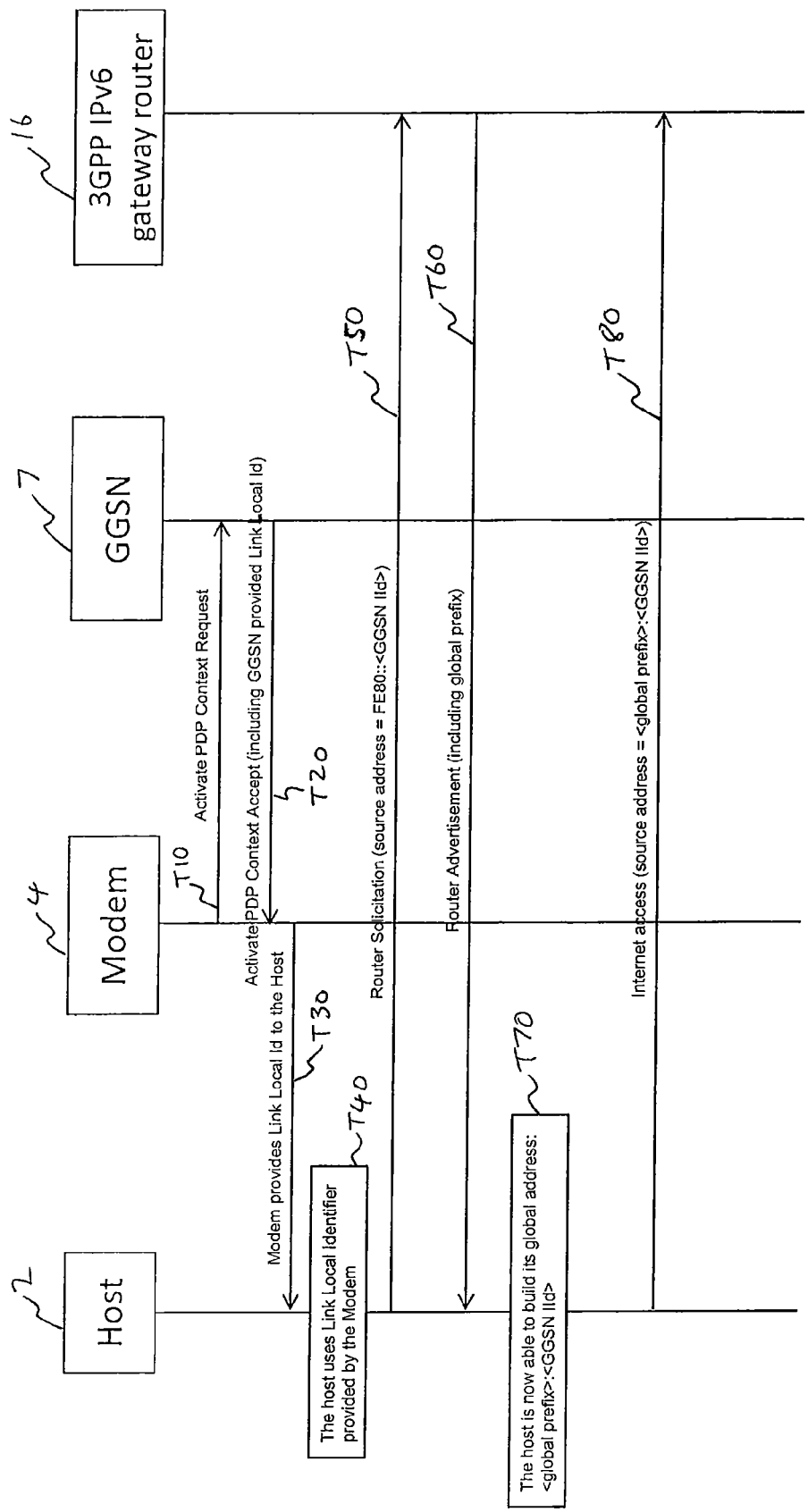
FIG. 3 is a signalling chart of another embodiment of a stateless auto address configuration method.

FIG. 3 is a signalling chart illustrating a situation that could be implemented for example under the 3GPP and IETF standards, in which the host terminal 2 does connect to the internet 8 via an external modem 4 and mobile cellular network 6 as described in relation to FIG. 1, and in which for the sake of comparison with disclosed embodiments of the host terminal 2 is able to accept a Link Local Identifier (IId) from the GGSN 7 of the mobile network 6. For example this may describe a stateless auto address configuration (SLACC) process in a 3GPP environment.

At step T10 of FIG. 3, the modem 4 sends a request to the GGSN 7 to activate a PDP context 20 (or EPS bearer context or such like) with the mobile cellular network 6. In response, at step T20 the GGSN 7 returns an acceptance to the modem 4, and the requested context 20 is established between the modem 4 and gateway 16 via a suitable access point 12 of the mobile network 6 such as an APN 12i or 12ii. The acceptance response from the GGSN comprises a Link Local Identifier (IId) generated by the GGSN 7 of the 3GPP network 6 for allocation to the host terminal 2 as a source identifier. At step T30, the modem 4 sends this allocated Link Local Identifier onwards to the host terminal 2, where it is adopted by the host terminal 2 at step T40.

At step T50, as a part of a router discovery procedure, the host terminal 2 sends a router solicitation message to the gateway 16. The router solicitation message again comprises as an initial or provisional source address a fixed, default prefix (in this case FE80) like in step S20 of FIG. 2, but in the scenario of FIG. 3 it is combined with the Link Local Identifier provided from the GGSN 7 as a suffix (instead of one autonomously generated by the host 2 itself). The Link Local Identifier allocated by the GGSN 7 acts, in the initial source address, as a source identifier to initially identify the host terminal 2 to the gateway 16 within the discovery procedure. The router discovery procedure continues at step T60 with the return of a router advertisement message from the gateway 16 to the host terminal 2, like in step S30 of FIG. 2. The returned router advertisement message comprises a global prefix for use by the host terminal 2 in building a Local Link Address, which it does at step T70. This is like step S40 of FIG. 2 except that this time the host terminal 2 builds its global LLA address by concatenating or combining the global prefix provided by the gateway 16 with the Link Local Identifier provided from the GGSN 7 as a suffix. The result is a composite address in the form of a Local Link Address which the host terminal 2 can use as a source address to identify itself to the gateway 16 within the link layer protocol for subsequent communications sent from the host terminal 2 to the router 12. See step T80.

This is a scenario consistent with what is prescribed by current 3GPP standards. However, a problem may occur when a particular operating system does not offer the possibility to force a particular Link Local Identifier and instead uses an auto-generated one. So in the example of FIG. 3, step T30 is not possible, or at least the host terminal 2 will ignore or otherwise not accept the Link Local Identifier (IId) provided from the GGSN 7 via the modem 4, and instead the host terminal 2 generates its own Link Local Identifier for use as a source identifier. In this case, without any measures to address the problem, the 3GPP network 6 will receive packets from an unknown Link Local Address. The 3GPP network 6 could in principle update its routing table with the received address, but some operators will not do this as it would violate 3GPP recommendations. As such, this is the disclosed embodiments are applicable.

To address such problems, in some embodiments an address translation scheme is incorporated into the modem 4. The Link Local Address translation feature will intercept any outgoing packet using a Link Local source address comprising a Link Local Identifier different from the one provided by the GGSN 7, and will replace it by the one expected by the mobile network 6. The same way, incoming packets will be updated with the Link Local Identifier expected by the host 2. This address translation feature can also take any other appropriate actions such as recalculating the checksum. This way the Link Local Address mismatch will be transparent to the host 2 and to the network 6. Once the global address is built, 3GPP standards allow usage of any autogenerated Link Local Identifier, so translation is no longer necessary from that stage forwards.

Figure 4:
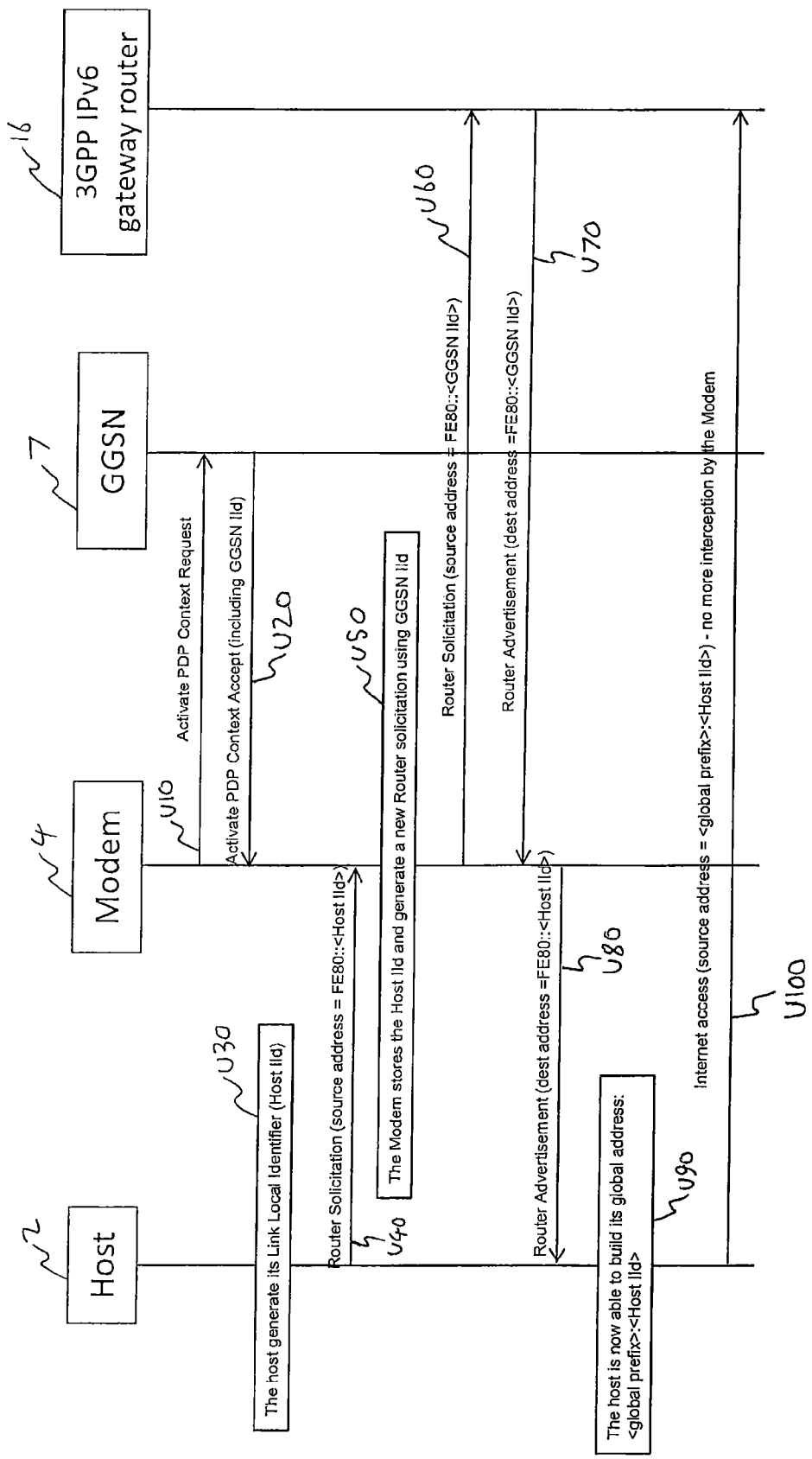
FIG. 4 is a signalling chart of yet another embodiment of a stateless auto address configuration method.

FIG. 4 is a signaling chart illustrating an application of the disclosure. This process may be incorporated for example as an improvement to a stateless auto address configuration (SLACC) process in a 3GPP environment.

At step U10 of FIG. 4, the modem 4 sends a request to the GGSN 7 to activate a PDP context 20 (or EPS bearer context or such like) with the mobile cellular network 6. The request is sent via the first interface apparatus 31, 5 of the modem 4, i.e. which comprise the wireless transceiver 31 such as an RF transceiver, and then via the mobile cellular network 6. The request could for example be a request to establish an IPv6 context 20ii with an IPv6 APN 12ii or a dual version compatibility context 20i with an IPv4v6 APN 12i. In response, at step T20 the GGSN 7 returns an acceptance to the modem 4, via the mobile cellular network 6 and the first interface apparatus 5, 31 of the modem 4; and the requested context 20 is thus established between the modem 4 and a gateway 16 via a suitable access point 12 of the mobile network 6 such as an IPv4v6 APN 12i or IPv6 APN 12ii, which connects to the internet or other such packet-based network via a suitable respective gateway 16i or 16ii. The acceptance response comprises a Link Local Identifier (GGSN IId) generated by the GGSN 7 of the 3GPP network 6 for allocation to the host terminal 2 as a source identifier.

Meanwhile, at step U30 the host terminal 2 generates its own Link Local Identifier (Host IId) for use as a source identifier of the host 2. The host's own Link Local Identifier could be random or derived from the host's Mac address if available. The modem 4 cannot force or otherwise cause the host terminal 2 to adopt the Link Local Identifier generated by and received from the GGSN 7 of the 3GPP network 6—i.e. there is no step analogous to step T30 of FIG. 3, or at least if such a step is attempted by the modem 4 then it will be ignored, rejected or otherwise not adopted by the host terminal 2, e.g. because the operating system running on the host terminal 2 is configured to reject or ignore it or is configured without the ability to accept it.

To address this kind of problem, the modem 4 is configured with a translator feature 35. In one embodiment, this feature is implemented in the form of computer-readable code embodied on a non-transitory computer-readable storage medium of the modem 4—such as one or more electronic memories (e.g. EEPROM, sometimes called a "flash" memory) and/or one or more magnetic memories—and arranged for execution on a processing apparatus 33 of the modem 4. Other soft modem code may also be implemented on a storage medium 35 of the modem 4 and arranged for execution on the processor. Alternatively some or all of the functionality of the translation feature 35 and/or some or all of the modem functionality can be implemented in dedicated processing apparatus in the form of dedicated hardware circuitry.

To facilitate the translation, the translator 35 stores the Link Local Identifier (IId) it has received from the GGSN 7 of the 3GPP network 6 (or other such element of a mobile network) on a storage medium of the modem 4, such as storage medium 35 or in a register. This happens at the end of step U20.

At step U40, as a part of a router discovery procedure, the host terminal 2 sends a router solicitation message intended for the gateway 16, via the second interface apparatus 32 of the modem 4. The router solicitation message comprises as an initial or provisional source address a fixed, default prefix (in this case FE80) combined with the Link Local Identifier (Host Id) autonomously generated by the host 2 as a suffix. The Link Local Identifier (Host Id) in the initial source address is included by the host 2 as a source identifier which in principle should initially identify the host terminal 2 to the gateway 16 within the discovery procedure. However, as the host's Link Local Identifier (Host IId) was not allocated by the GGSN 7 and some operators will not update their routing tables to recognise the host's own Link Local Identifier. Therefore although the host 2 uses its own Link Local Identifier (Host Id) as a source identifier in the router solicitation message, the gateway 16 of the 3GPP network 6 and Internet 8 (or other such network element) may not recognise this as a source identifier.

To confront this issue, the translator 35 is configured so as in operation to intercept the router solicitation message received from the host terminal 2 via the second interface apparatus 32 (e.g. USB connection), and to map the host's own autonomously generated Link Local Identifier (Host Id) received in that message to the Link Local Identifier (GGSN IID) received from the GGSN 7 via the mobile network 6 and first interface apparatus 31 (e.g. via the 3GPP network 6 and RF transceiver). This happens at the end of step U40. The translator 35 is further configured to then, at step U50, re-formulate the router solicitation message with the Link Local Identifier from the host (Host Id) replaced with the GGSN's allocated Link Local Identifier (GGSN IID) as the suffix of the source address (with the same fixed prefix e.g. FE80). Hence the source identifier (and therefore the address containing it as a suffix) is translated. At step U60 the modem 4 sends the re-formulated router solicitation message, with the address having the translated source identifier, onwards to the gateway 16 via the first interface apparatus 31, 5 and mobile cellular network 6 (e.g. via the RF interface and 3GPP network).

At step U70, in response to the router solicitation message, the gateway 16 sends back a router advertisement message comprising a global prefix for use by the host terminal in building a Local Link Address. The returned router advertisement message also comprises a destination address having a fixed prefix and the GGSN's allocated Link Local Identifier (GGSN IId) as a suffix, sent back via the mobile network 6 and second interface apparatus 5, 31. Since the host 2 may still not recognize or accept the GGSN's allocated Link Local Identifier as a destination identifier, at step U80 the translator 35 on the modem 4 intercepts the router advertisement message and translates the GGSN's Link Local Identifier (GGSN IId) back to the host's own Link Local Identifier (Host Id), by means of a mapping similar to that described above but in reverse. Step U80 then continues as the modem 4 sends the translated router advertisement address with its translated destination identifier and address onwards to the host terminal 2, via the second interface apparatus 32.

From this point forward, the host terminal is enabled to builds its global LLA address by concatenating or otherwise combining the global prefix provided by the gateway 16 with the Link Local Identifier (Host IId) generated by the host 2 as a suffix, in a manner similar to step S40 in FIG. 2 or step T70 of FIG. 3, but with the address mismatch problem having been made transparent to the host 2 and mobile network 6. The result is a composite address in the form of a Local Link Address which the host terminal 2 can use as a source address to identify itself to the router 16 within the link layer protocol for subsequent communications sent from the host terminal 2 to the router 12. See step U100. Once the global address is built, 3GPP standards allows usage of any autogenerated Link Local Identifier, so translation is no longer necessary from that stage forwards.

It will be appreciated that the above embodiments have been described only by way of example, and other variants or applications may be apparent to a person skilled in the art given the disclosure herein. For instance, while embodiments above have been described in relation to certain standards such as Ethernet, 3GPP networks, IPv6 and so forth, these are not intended to be limiting and the disclosure may in fact be applied wherever a network element generates a link layer identifier intended for a host terminal as a source identifier, but where the host does not use the link layer identifier as the intended source identifier and instead generates its own identifier for that purpose. Further, while the above has been described in terms of a GGSN, it will be understood that other network elements may be responsible for providing link layer identifiers, and such elements could for example reside in either in the mobile network, the further network or the gateway. Furthermore, it will be appreciated that the term gateway could describe any network element operating between one network and another and could equally be considered an element of either or both networks or a distinct element (and that whether they are described as such may merely be matter of terminology). The disclosure is not limited by the example embodiments but only by the appending claims.

The invention claimed is:

1. A unit for use at a terminal as an external wireless modem, the unit comprising:
   first interface apparatus comprising a first wireless transceiver for connecting via a wireless cellular network to a gateway between the wireless cellular network and a further, packet-based network;
   second interface apparatus for connecting to the terminal; and
   processing apparatus configured to perform operations of a wireless cellular modem so as to enable the terminal to access the further network via the wireless cellular network and gateway;
   wherein the processing apparatus is arranged to receive a first link layer identifier from one of the wireless cellular network, the gateway and the further network, intended for use by the terminal as a source identifier when accessing the further network via the wireless cellular network and gateway; and
   wherein the processing apparatus is configured to intercept at least one message being conveyed from the terminal to the gateway comprising a second link layer identifier generated by the terminal as a source identifier, to translate the second identifier into the first link layer identifier, and to retransmit the message to the gateway with the first link layer identifier as the source identifier.

2. The unit of claim 1, wherein the processing apparatus is arranged to send a request to the gateway, and to receive back a response comprising the first link layer identifier from the gateway.

3. The unit of claim 2, wherein the request comprises a request to establish a context between the unit and the gateway via the wireless cellular network.

4. The unit of claim 1, wherein the at least one message comprises a solicitation message soliciting a link layer address portion from the gateway.

5. The unit of claim 4, wherein the processing apparatus is arranged to receive back an advertisement message comprising the link layer address portion returned from the gateway in response to the solicitation message.

6. The unit of claim 5, wherein the advertisement message comprises the first link layer identifier as a destination identifier; and the processing apparatus is configured to intercept the advertisement message being conveyed from the gateway to the terminal, to translate the first link layer identifier into the second link layer identifier, and to retransmit the advertisement message to the gateway with the second link layer identifier as the destination identifier.

7. The unit of claim 6, wherein the terminal is thus enabled to build a composite source link layer address for use in accessing the further network via the cellular network, by combining the link layer address portion with the second link layer identifier; and the processing apparatus allows the terminal to access the further network via the wireless cellular network and gateway based on communications received from the terminal comprising the composite source link layer address.

8. The unit of claim 1, wherein the processing apparatus is unable to cause the terminal to accept the first link layer identifier for use as the source identifier.

9. The unit of claim 8, wherein the processing apparatus is unable to cause the terminal to accept the first link layer identifier for use as the source identifier due to an operating system used on the terminal.

10. The unit of claim 1, wherein the further network is the Internet.

11. The unit of claim 1, wherein the mobile cellular network is a 3GPP network.

12. The apparatus of claim 1, wherein the second interface apparatus comprises a wired connector.

13. The unit of claim 12, wherein the unit comprises a dongle housing said processing apparatus and for plugging into said terminal via the second interface apparatus.

14. The unit of claim 1, wherein the second interface apparatus comprises a second wireless transceiver for connecting to the terminal via a local wireless connection.

15. The unit of claim 1, wherein the unit comprises a mobile phone housing said processing apparatus and for connecting to said terminal via the second interface apparatus, the mobile phone thus being operable as a telephone and as an external wireless cellular modem for the terminal.

16. A computer program product for operating a unit, for use at a terminal as an external wireless modem, the unit having a processing apparatus; a first interface apparatus comprising a first wireless transceiver for connecting via a wireless cellular network to a gateway between the wireless cellular network and a further, packet-based network; and a second interface apparatus for connecting to the terminal;

wherein the computer program product comprises a non-transitory computer-readable medium encoded thereon computer codes and configured so as when executed on the processing apparatus of said unit to perform operations of a wireless cellular modem so as to enable the terminal to access the further network via the first interface apparatus, second interface apparatus, wireless cellular network and gateway, including to perform operations of:

receiving a first link layer identifier from the gateway via the first interface apparatus, the first link layer identifier being intended for use by the terminal as a source identifier when accessing the further network via the wireless cellular network and gateway;

intercepting at least one message being conveyed from the terminal to the gateway via the second interface apparatus, the at least one message comprising a second link layer identifier generated by the terminal as a source identifier;

translating the second link layer identifier into the first link layer identifier; and retransmitting the message to the gateway via the first interface apparatus and wireless cellular network, the message being retransmitted with the first identifier as the source identifier.

17. The computer program product of claim 16, wherein the code is configured so as when executed on the processing apparatus to send a request to the gateway, and to receive back a response comprising the first link layer identifier from the gateway.

18. The computer program product of claim 17, wherein the request comprises a request to establish a context between the unit and the gateway via the wireless cellular network.

19. The computer program product of claim 16, wherein the at least one message comprises a solicitation message soliciting a link layer address portion from the gateway.

20. The computer program product of claim 19, wherein the code is configured so as when executed on the processing apparatus to receive back an advertisement message comprising the link layer address portion returned from the gateway in response to the solicitation message.

21. The computer program product of claim 20, wherein the advertisement message comprises the first link layer identifier as a destination identifier; and the code is configured so as when executed on the processing apparatus to intercept the advertisement message being conveyed from the gateway to the terminal, to translate the first link layer identifier into the second link layer identifier, and to retransmit the advertisement message to the gateway with the second link layer identifier as the destination identifier.

22. The computer program product of claim 21, wherein the terminal is thus enabled to build a composite source link layer address for use in accessing the further network via the cellular network, by combining the link layer address portion with the second link layer identifier; and the code is configured so as when executed on the processing apparatus to allow the terminal to access the further network via the wireless cellular network and gateway based on communications received from the terminal comprising the composite source link layer address.

23. The computer program product of claim 16, wherein the code executed on the processing apparatus is unable to cause the terminal to accept the first link layer identifier for use as the source identifier.

24. The computer program product of claim 23, wherein the code executed on the processing apparatus is unable to cause the terminal to accept the first link layer identifier for use as the source identifier due to an operating system used on the terminal.

25. The computer program product of claim 16, wherein the further network is the Internet.

26. The computer program product of claim 16, wherein the mobile cellular network is a 3GPP network.

27. A method of operating a unit connected to a terminal as an external wireless modem for the terminal, the unit having a first interface apparatus comprising a first wireless transceiver for connecting via a wireless cellular network to a gateway between the wireless cellular network and a further, packet-based network; a second interface apparatus for connecting to the terminal; and a processing apparatus for perform operations of a wireless cellular modem so as to enable the terminal to access the further network via the first interface apparatus, second interface apparatus, wireless cellular network and gateway;

wherein the method comprises:

at the processing apparatus of said unit, receiving a first link layer identifier via the first interface apparatus from one of the wireless cellular network, the gateway and the further network, the first link layer identifier being intended for use by the terminal as a source identifier when accessing the further network via the wireless cellular network and gateway;

at the processing apparatus of said unit, intercepting at least one message being conveyed from the terminal to the gateway via the second interface apparatus, the at least one message comprising a second link layer identifier generated by the terminal as a source identifier;

at the processing apparatus of said unit, translating the second link layer identifier into the first link layer identifier; and from the processing apparatus of said unit, retransmitting the message to the gateway via the first interface apparatus and wireless cellular network, the message being retransmitted with the first identifier as the source identifier.

28. A system comprising:

a terminal;

a wireless cellular network;

a gateway between the wireless cellular network and a further, packet-based network; and a unit for use at the terminal as an external wireless modem, the unit comprising a first interface apparatus comprising a first wireless transceiver for connecting via a wireless cellular network to said gateway, a second interface apparatus for connecting to the terminal, and processing apparatus configured to perform operations of a wireless cellular modem so as to enable the terminal to access the further network via the wireless cellular network and gateway;

wherein the processing apparatus is arranged to receive a first link layer identifier from one of the wireless cellular network, the gateway and the further network, intended for use by the terminal as a source identifier when accessing the further network via the wireless cellular network and gateway; and wherein the message processing apparatus is configured to intercept at least one message being conveyed from the terminal to the gateway comprising a second link layer identifier generated by the terminal as a source identifier, to translate the second identifier into the first link layer identifier, and to retransmit the message to the gateway with the first link layer identifier as the source identifier.

* * * * *